(12) United States Patent
Granger-Jones et al.

(10) Patent No.: US 9,172,441 B2
(45) Date of Patent: Oct. 27, 2015

(54) FRONT END CIRCUITRY FOR CARRIER AGGREGATION CONFIGURATIONS

(71) Applicant: RF Micro Devices, Inc., Greensboro, NC (US)

(72) Inventors: Marcus Granger-Jones, Scotts Valley, CA (US); Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 27 days.

(21) Appl. No.: 13/929,987

(22) Filed: Jun. 28, 2013

(65) Prior Publication Data

US 2014/0227982 A1   Aug. 14, 2014

Related U.S. Application Data

(60) Provisional application No. 61/762,455, filed on Feb. 8, 2013.

(51) Int. Cl.

| H04B 1/44 | (2006.01) |
|---|---|
| H04B 7/04 | (2006.01) |
| H04B 7/06 | (2006.01) |
| H01Q 1/24 | (2006.01) |
| H01Q 21/28 | (2006.01) |
| H04B 1/00 | (2006.01) |
| H04B 1/3816 | (2015.01) |

(52) U.S. Cl.
CPC ............. *H04B 7/0404* (2013.01); *H01Q 1/242* (2013.01); *H01Q 21/28* (2013.01); *H04B 1/006* (2013.01); *H04B 1/0064* (2013.01); *H04B 7/0691* (2013.01); *H04B 1/3816* (2013.01)

(58) Field of Classification Search
CPC ............. H04B 1/40; H04B 1/401; H04B 1/44
USPC ............. 455/73, 77, 78, 83, 87, 562.1, 575.7, 455/107, 120, 168.1, 178.1, 191.1, 1, 91.3, 455/193.1, 193.2, 248.1, 269, 272, 277.1, 455/280
See application file for complete search history.

(56) References Cited

U.S. PATENT DOCUMENTS

| 4,498,057 A | 2/1985 | Noro |
|---|---|---|
| 5,502,422 A | 3/1996 | Newell et al. |
| 6,091,970 A | 7/2000 | Dean |
| 6,128,474 A | 10/2000 | Kim et al. |
| 6,405,018 B1 * | 6/2002 | Reudink et al. .................. 455/20 |
| 7,187,945 B2 | 3/2007 | Ranta et al. |
| 7,212,788 B2 | 5/2007 | Weber et a |
| 7,251,499 B2 | 7/2007 | Ellä et al. |
| 7,864,491 B1 | 1/2011 | Bauder et al. |
| 7,872,547 B2 | 1/2011 | Song et al. |
| 7,973,645 B1 | 7/2011 | Moretti et al. |

(Continued)

OTHER PUBLICATIONS

Non-Final Office Action for U.S. Appl. No. 13/852,309, mailed Oct. 14, 2014, 10 pages.

(Continued)

*Primary Examiner* — Tuan Pham (74) *Attorney, Agent, or Firm* — Withrow & Terranova, P.L.L.C.

(57) ABSTRACT

Radio frequency (RF) front end circuitry includes one or more antenna ports, one or more RF switching ports, and an RF switch matrix coupled between the antenna ports and the RF front end ports. The RF switch matrix comprises a dual 4×4 multiplexer, and is adapted to selectively couple any one of the antennas to any one of the plurality of RF switching ports.

21 Claims, 10 Drawing Sheets

(56) References Cited

U.S. PATENT DOCUMENTS

| | | |
|---|---|---|
| 7,996,003 B2 | 8/2011 | Maeda et al. |
| 8,208,867 B2 | 6/2012 | Lum et al. |
| 8,437,438 B2 | 5/2013 | Kuwahara |
| 8,565,701 B2 | 10/2013 | Sanchez et al. |
| 8,571,489 B2 | 10/2013 | Mikhemar et al. |
| 8,634,029 B2 | 1/2014 | Pugel |
| 8,718,582 B2 | 5/2014 | See et al. |
| 8,774,065 B2 | 7/2014 | Khlat et al. |
| 8,774,067 B2 | 7/2014 | Rousu et al. |
| 2005/0245202 A1 | 11/2005 | Ranta et al. |
| 2005/0277387 A1 | 12/2005 | Kojima et al. |
| 2006/0012425 A1 | 1/2006 | Ohnishi et al. |
| 2006/0025171 A1 | 2/2006 | Ly et al. |
| 2006/0240785 A1* | 10/2006 | Fischer ..................... 455/78 |
| 2006/0276132 A1 | 12/2006 | Sheng-Fuh et al. |
| 2006/0293005 A1 | 12/2006 | Hara et al. |
| 2007/0280185 A1 | 12/2007 | McFarland et al. |
| 2008/0003797 A1 | 1/2008 | Kim |
| 2009/0180403 A1 | 7/2009 | Tudosoiu |
| 2009/0286501 A1 | 11/2009 | Rousu et al. |
| 2009/0303007 A1* | 12/2009 | Ryou et al. ................ 340/10.1 |
| 2010/0079347 A1 | 4/2010 | Hayes et al. |
| 2010/0099366 A1 | 4/2010 | Sugar et al. |
| 2010/0291888 A1 | 11/2010 | Hadjichristos et al. |
| 2011/0001877 A1 | 1/2011 | Pugel |
| 2011/0069645 A1 | 3/2011 | Jones |
| 2011/0241782 A1 | 10/2011 | Clifton |
| 2011/0241787 A1 | 10/2011 | Mastovich |
| 2012/0235735 A1 | 9/2012 | Spits et al. |
| 2012/0281597 A1 | 11/2012 | Khlat et al. |
| 2013/0122824 A1 | 5/2013 | Schell |
| 2013/0320803 A1 | 12/2013 | Maeda |
| 2013/0321095 A1 | 12/2013 | Lam et al. |
| 2013/0336181 A1 | 12/2013 | Khlat et al. |
| 2013/0337752 A1 | 12/2013 | Khlat |
| 2013/0337754 A1 | 12/2013 | Khlat |
| 2014/0015731 A1 | 1/2014 | Khlat et al. |
| 2014/0024322 A1 | 1/2014 | Khlat |
| 2014/0024329 A1 | 1/2014 | Khlat |
| 2014/0038675 A1 | 2/2014 | Khlat et al. |
| 2014/0073371 A1 | 3/2014 | Mujtaba et al. |
| 2014/0092795 A1 | 4/2014 | Granger-Jones |
| 2014/0105079 A1 | 4/2014 | Bengtsson et al. |
| 2014/0106693 A1 | 4/2014 | Khlat |

OTHER PUBLICATIONS

Non Final Office Action for U.S. Appl. No. 13/944,972, mailed Nov. 13, 2014, 10 pages.

Author Unknown, "3rd Generation Partnership Project; Technical Specification Group Radio Access Network; Evolved Universal Terrestrial Radio Access (E-UTRA); User Equipment (UE) Radio Transmission and Reception (Release 11)," Technical Specification 36.101, Version 11.1.0, Jun. 2012, 3GPP Organizational Partners, 336 pages.

Author Unknown, "MIPI Alliance Application Note for Analog Control Interface—Envelope Tracking," ACI-ET, Version 1.0.0, Release 19, Oct. 4, 2012, 1 page.

Djoumessi, Erick Emmanuel, et al., "Electronically Tunable Diplexer for Frequency-Agile Transceiver Front-End," 2010 IEEE MTT-S International Microwave Symposium Digest (MTT), May 23-28, 2010, pp. 1472-1475.

Valkenburg, M.E., Van. "12.2 Pole Reciprocation." Analog Filter Design. New York: CBS College Publishing, 1982. pp. 327-333.

Wang, Zhao-Ming, et al., "The Design of a Symmetrical Diplexer Composed of Canonical Butterworth Two-Port Networks," 1988 IEEE International Symposium on Circuits and Systems, vol. 2, Jun. 7-9, 1988, pp. 1179-1182.

Williams, Arthur Bernard, et al. Electronic Filter Design Handbook, 3rd. ed. New York: McGraw-Hill, 1995. pp. 3.1-4.7 and 11.72-11.73.

Zverev, Anatol I. Handbook of Filter Synthesis New York: John Wiley & Sons, 1967. pp. 192-193.

Notice of Allowance for U.S. Appl. No. 13/460,861, mailed Jan. 30, 2014, 9 pages.

Notice of Allowance for U.S. Appl. No. 13/045,604, mailed May 17, 2013, 11 pages.

Non-Final Office Action for U.S. Appl. No. 13/045,621, mailed May 31, 2013, 13 pages.

Notice of Allowance for U.S. Appl. No. 13/045,621, mailed Sep. 24, 2013, 10 pages.

Non-Final Office Action for U.S. Appl. No. 13/852,527, mailed Sep. 30, 2014, 19 pages.

Final Office Action for U.S. Appl. No. 13/852,527, mailed Jan. 12, 2015, 21 pages.

Non-Final Office Action for U.S. Appl. No. 13/942,778, mailed Jan. 22, 2015, 5 pages.

Final Office Action for U.S. Appl. No. 13/852,309, mailed Feb. 18, 2015, 12 pages.

Notice of Allowance and Examiner-Initiated Interview Summary for U.S. Appl. No. 14/052,221, mailed Feb. 26, 2015, 9 pages.

Non-Final Office Action for U.S. Appl. No. 13/852,527, mailed Apr. 23, 2015, 23 pages.

Notice of Allowance for U.S. Appl. No. 13/942,778, mailed May 14, 2015, 10 pages.

Advisory Action for U.S. Appl. No. 13/852,309, mailed Apr. 29, 2015, 4 pages.

Advisory Action for U.S. Appl. No. 13/852,309, mailed May 27, 2015, 4 pages.

Notice of Allowance for U.S. Appl. No. 13/944,972, mailed Apr. 13, 2015, 7 pages.

Non-Final Office Action for U.S. Appl. No. 14/051,601, mailed May 5, 2015, 6 pages.

Notice of Allowance for U.S. Appl. No. 13/852,527, mailed Aug. 14, 2015, 8 pages.

Notice of Allowance for U.S. Appl. No. 13/852,309, mailed Jul. 23, 2015, 7 pages.

Notice of Allowance for U.S. Appl. No. 14/051,601, mailed Aug. 14, 2015, 8 pages.

Non-Final Office Action for U.S. Appl. No. 13/950,432, mailed Jul. 28, 2015, 14 pages.

Non-Final Office Action for U.S. Appl. No. 13/952,880, mailed Jul. 29, 2015, 17 pages.

Corrected Notice of Allowance for U.S. Appl. No. 14/051,601, mailed Sep. 16, 2015, 5 pages.

Non-Final Office Action for U.S. Appl. No. 14/133,024, mailed Sep. 15, 2015, 28 pages.

* cited by examiner

| Operating Band | Uplink (UL) Operating Band | Downlink (DL) Operating Band | Duplex Mode |
| --- | --- | --- | --- |
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | Reserved | Reserved | - |
| 16 | Reserved | Reserved | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

*FIG. 1*

(RELATED ART)

FRONT END CIRCUITRY FOR CARRIER AGGREGATION CONFIGURATIONS

RELATED APPLICATIONS

This application claims the benefit of U.S. provisional patent application Ser. No. 61/762,455, filed Feb. 8, 2013, the disclosure of which is incorporated herein by reference in its entirety.

FIELD OF THE DISCLOSURE

The present disclosure relates to front end circuitry for use in a mobile device. Specifically, the present disclosure relates to front end circuitry for use in a mobile device using carrier aggregation.

BACKGROUND

Modern mobile telecommunications standards continue to demand increasingly greater rates of data exchange (data rates). One way to achieve a high data rate in a mobile device is through the use of carrier aggregation. Carrier aggregation allows a single mobile device to aggregate bandwidth across one or more operating bands in the wireless spectrum. The increased bandwidth achieved as a result of carrier aggregation allows a mobile device to obtain higher data rates than have previously been available.

Figure 1:
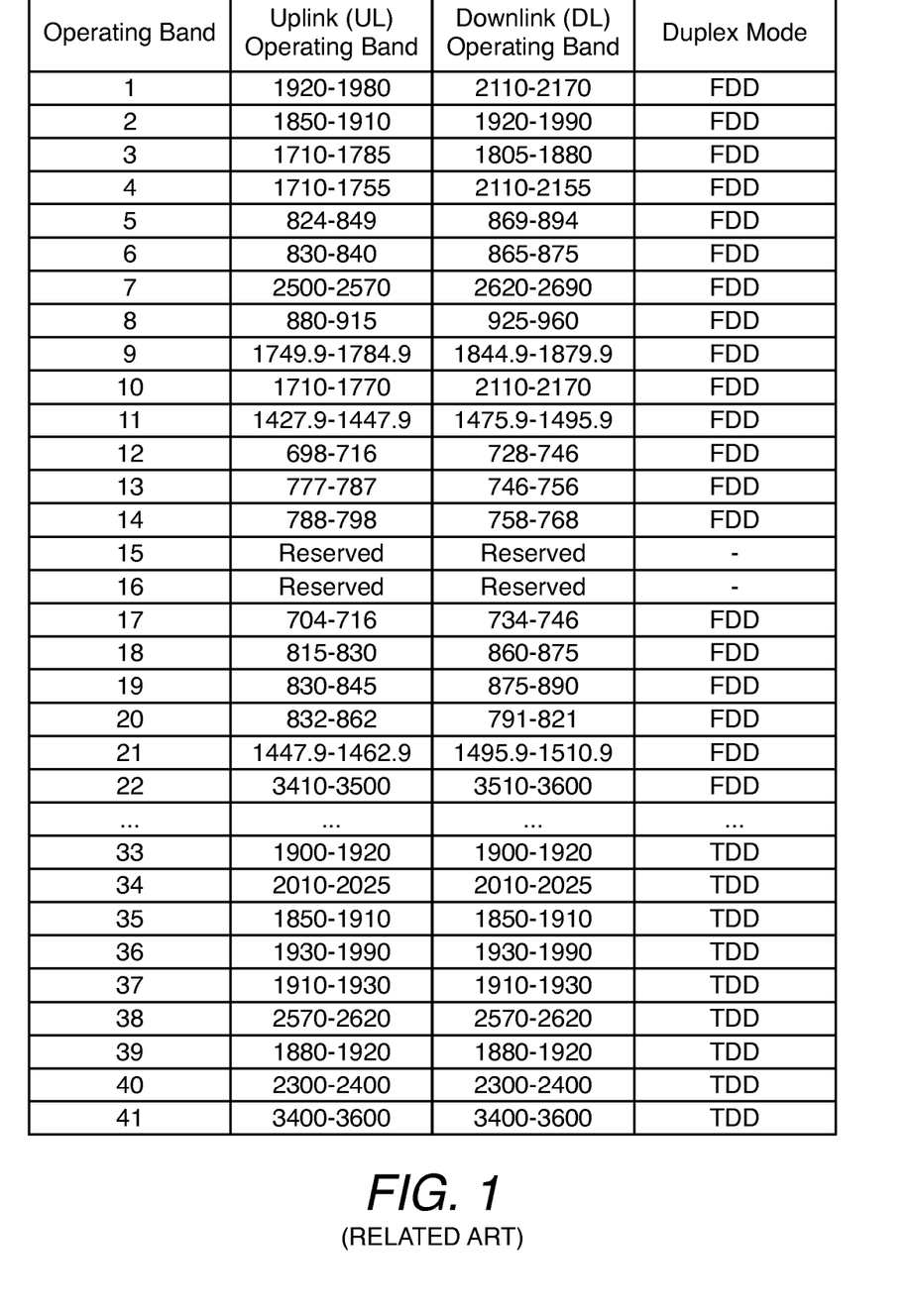
FIG. 1 is a chart illustrating various operating bands in the mobile spectrum.

FIG. 1 shows a table describing a number of wireless communications bands in the wireless spectrum. One or more of the wireless communications bands may be used, for example, in a CDMA, GSM, LTE, or LTE-advanced equipped mobile device. The first column indicates the operating band number for each one of the operating bands. The second and third columns indicate the uplink and downlink frequency bands for each one of the operating bands, respectively. Finally, the fourth column indicates the duplex mode for each one of the operating bands. In non-carrier aggregation configurations, a mobile device will generally communicate using a single portion of the uplink or downlink frequency bands within a single operating band. In carrier aggregation applications, however, a mobile device may aggregate bandwidth across a single operating band or multiple operating bands in order to increase the data rate of the device.

Figure 2A:
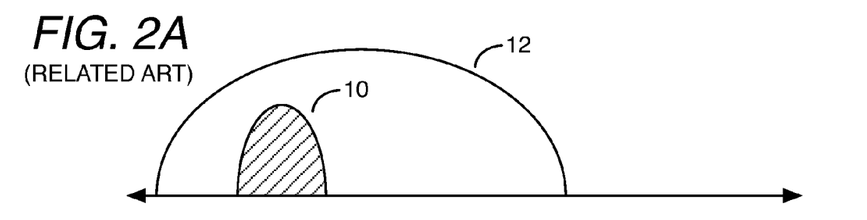
FIGS. 2A-2E are graphical representations of various carrier aggregation configurations for use in a mobile terminal.

FIG. 2A shows a diagram representing a conventional, non-carrier aggregation configuration for a mobile device. In the conventional configuration, a mobile device communicates using a single portion of the wireless spectrum 10 within a single operating band 12. Under the conventional approach, the data rate of the mobile device is constrained by the limited available bandwidth.

Figure 2B:
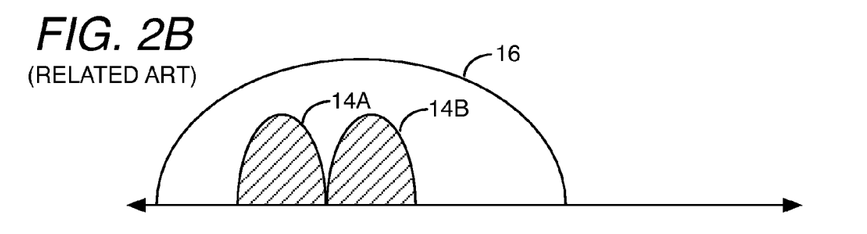
Figure 2C:
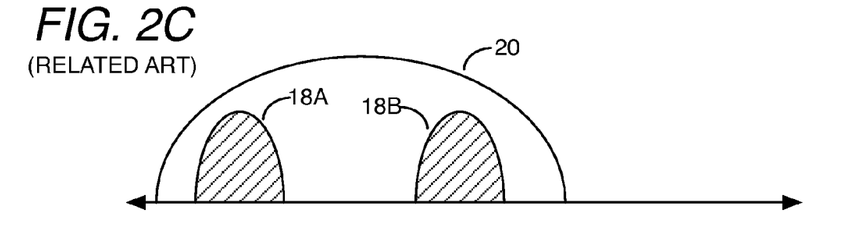
Figure 2D:
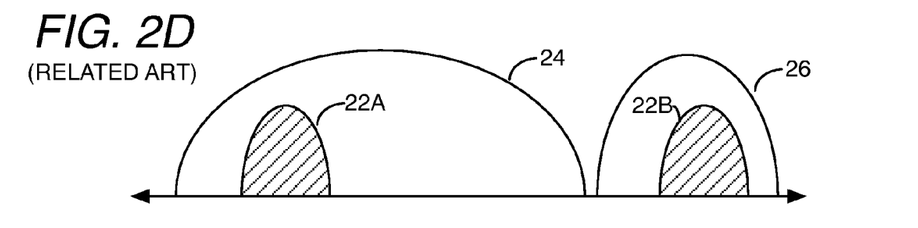
Figure 2E:
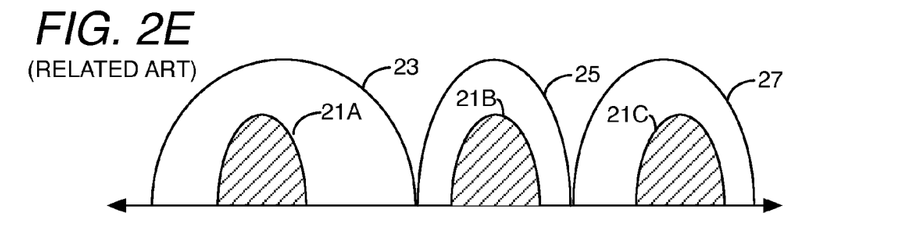

FIGS. 2B-2E show diagrams representing a variety of carrier aggregation configurations for a mobile device. FIG. 2B shows an example of contiguous, intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. FIG. 2D shows an example of inter-band carrier aggregation, in which aggregated portions of the wireless spectrum 22A and 22B are located in different operating bands 24, 26. A modern mobile device should be capable of supporting each one of the previously described carrier aggregation configurations. Finally, FIG. 2E shows an example of inter-band carrier aggregation across three operating bands, in which the aggregated portions of the wireless spectrum 21A, 21B, and 21C are located in different operating bands 23, 25, and 27. Additional carrier aggregation configurations may aggregate bandwidth across four or more operating bands.

The use of carrier aggregation may pose unique problems for the front end circuitry in a mobile device. For instance, a mobile device using carrier aggregation may require two or more antennas. The use of more than one antenna may complicate the design of the front-end switching circuitry within the mobile device. Additionally, the use of carrier aggregation across certain operating bands may cause undesirable interference between transmit and receive circuitry in a mobile device front end that renders the mobile device unusable in these operating bands.

Figure 3:
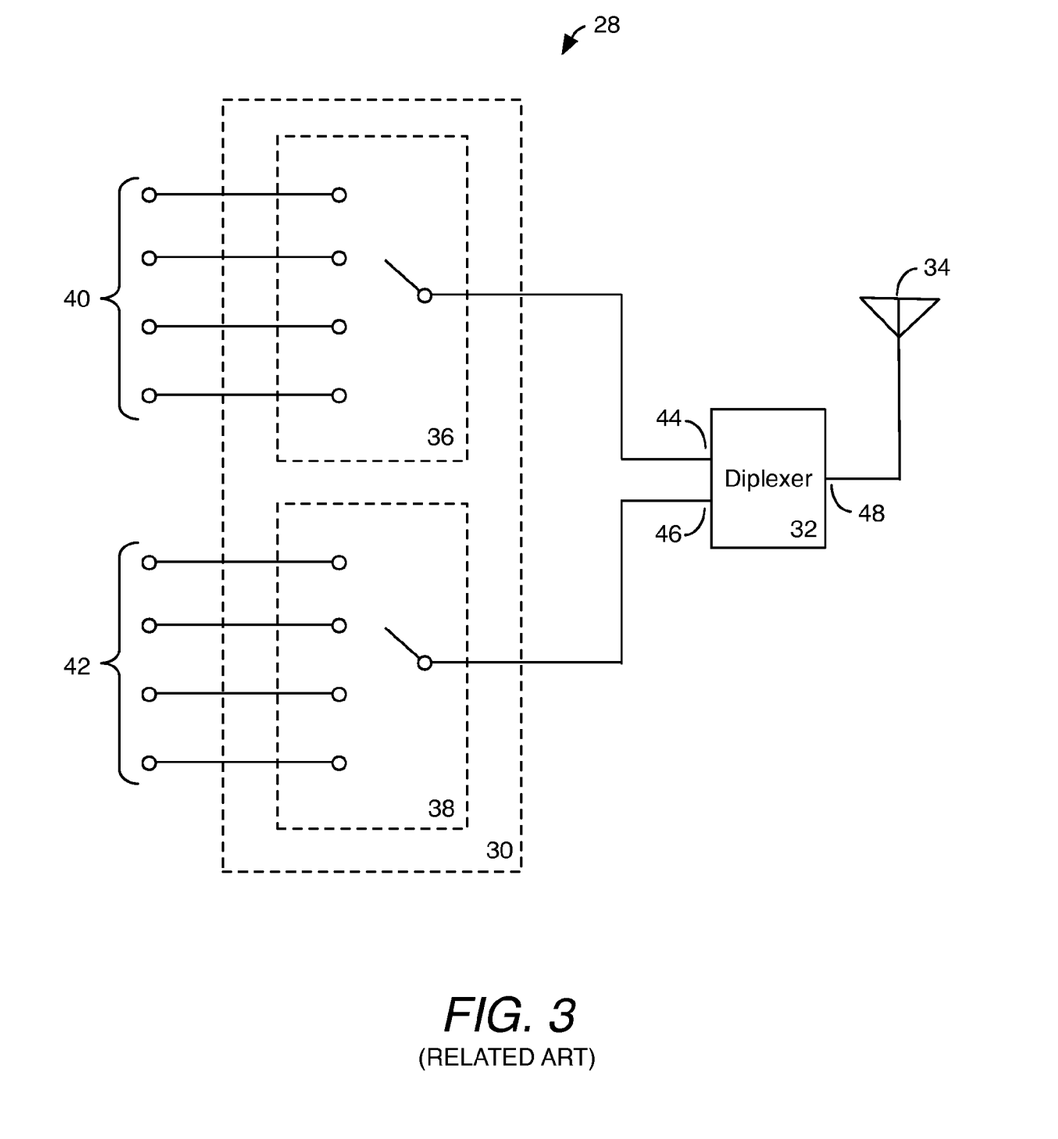
FIG. 3 is a schematic representation of conventional front end circuitry for use in a mobile terminal.

FIG. 3 shows conventional front end circuitry 28 for use in a mobile terminal. The front end circuitry 28 includes antenna switching circuitry 30, a diplexer 32, and an antenna 34. The antenna switching circuitry 30 includes low band switching circuitry 36 and high band switching circuitry 38. The low band switching circuitry 36 is adapted to couple one of a first plurality of RF front end ports 40 to the antenna 34 through the diplexer 32. The high band switching circuitry 38 is adapted to couple one of a second plurality of RF front end ports 42 to the antenna 34 through the diplexer 32. The diplexer 32 includes a low band port 44 coupled to the low band switching circuitry 36, a high band port 46 coupled to the high band switching circuitry 38, and an antenna port 48 coupled to the antenna 34. The diplexer 32 is adapted to pass high band signals falling within a high pass band between the high band port 46 and the antenna port 48, pass low band signals falling within a low pass band between the low band port 44 and the antenna port 48, and attenuate signals outside of the high and low pass bands. Although effective at selectively placing the antenna 34 in communication with the appropriate RF front end port, the conventional front end circuitry 28 shown in FIG. 3 is not suitable for carrier aggregation applications that require multiple antennas.

Figure 4:
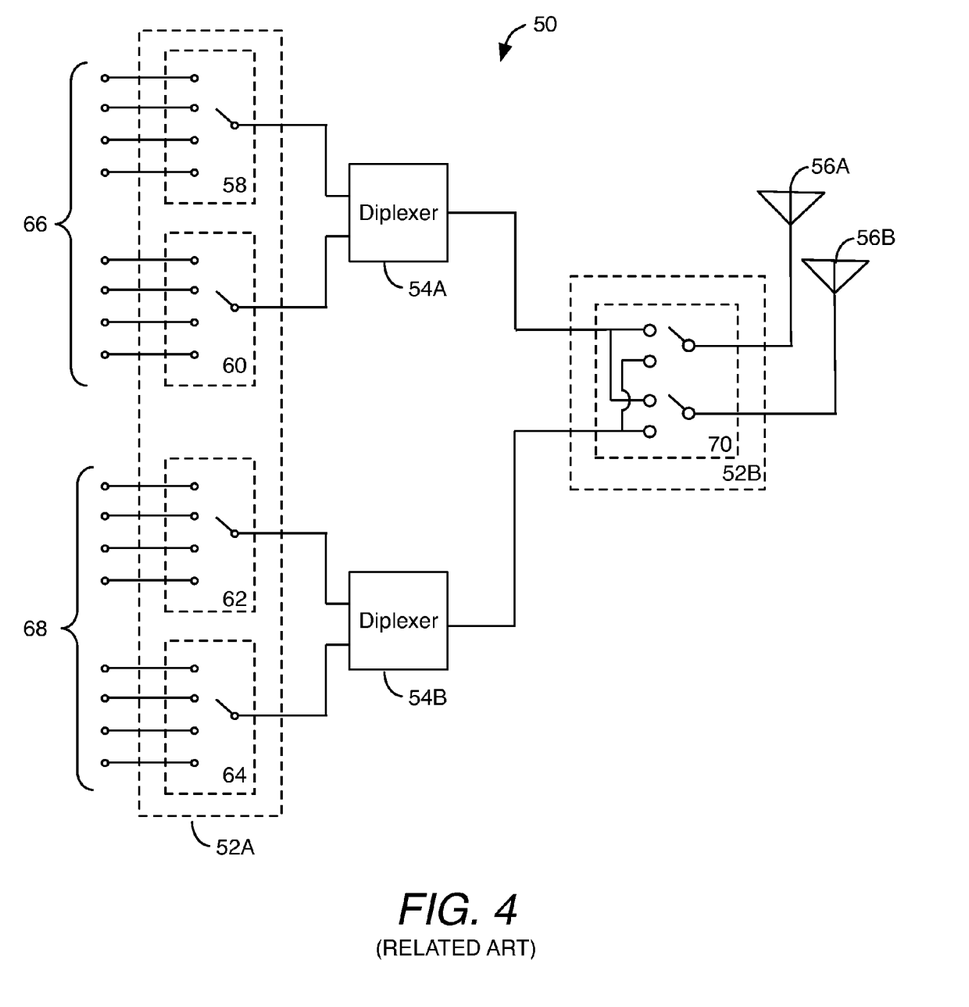
FIG. 4 is a schematic representation of conventional front end circuitry for use in a mobile terminal.

FIG. 4 shows conventional front end circuitry 50 for use in a mobile terminal with two antennas. The front end circuitry 50 includes antenna switching circuitry 52, a first diplexer 54A, a second diplexer 54B, a first antenna 56A, and a second antenna 56B. The antenna switching circuitry 52 includes first antenna switching circuitry 52A and second antenna switching circuitry 52B. The first antenna switching circuitry 52A includes first low band switching circuitry 58, first high band switching circuitry 60, second low band switching circuitry 62, and second high band switching circuitry 64. The first low band switching circuitry 58 and the first high band switching circuitry 60 are adapted to selectively couple one of a first plurality of RF front end ports 66 to the second antenna switching circuitry 52B through the first diplexer 54A. The second low band switching circuitry 62 and the second high band switching circuitry 64 are adapted to selectively couple one of a second plurality of RF front end ports 68 to the second antenna switching circuitry 52B through the second diplexer 54B. The second antenna switching circuitry 52B includes antenna selection circuitry 70, which is adapted to selectively place the first antenna 56A and the second antenna 56B in communication with either the first diplexer 54A or the second diplexer 54B.

The antenna switching circuitry 52 may comprise a plurality of transistors and other assorted passive components. As is well known in the art, non-linearity of the transistors and other passive components within the antenna switching circuitry 52 may generate harmonic distortion about a passing signal. In certain carrier aggregation configurations, the generated harmonic distortion can cause desensitization of receive circuitry in the conventional front end circuitry 50 illustrated in FIG. 4. For example, the conventional front end circuitry 50 may experience problems in a carrier aggregation configuration using bands 3 and 8 (CA 3-8). In a CA 3-8 configuration, the conventional front end circuitry 50 will couple one of the second plurality of RF front end ports 68 corresponding with the band 8 transmit port to the antenna selection circuitry 70 in order to transmit a carrier signal between 880-915 MHz. As the carrier signal passes through the first low band switching circuitry 58, harmonic distortion is generated. The carrier signal and harmonic distortion travel through the first diplexer 54A, where the harmonic distortion is effectively filtered. However, as the carrier signal travels through the antenna selection circuitry 70, additional harmonic distortion is generated.

Because at least a portion of the second harmonic of the band 8 uplink band (1760-1830 MHz) falls within the band 3 downlink band (1805-1880 MHz), components of the harmonic distortion about the second harmonic are within the high pass band of the first diplexer 54A, and a portion of the harmonic distortion will be delivered to the first high band switching circuitry 60. Further, because the front end circuitry 50 is configured to simultaneously transmit on band 8 and receive on band 3, one of the first plurality of RF front end ports 66 corresponding with the band 3 receive port will be coupled to the first diplexer 54A through the first high band switching circuitry 60. Accordingly, a portion of the distorted band 8 transmit signal about the second harmonic will be delivered to the band 3 receive circuitry, where it will cause desensitization. Additionally, the harmonic distortion in the carrier signal will be presented to the antennas 56A and 56B, thereby degrading the quality of the wireless signal. As a result of the desensitization of the receiver circuitry, the performance of the front end circuitry 50 illustrated in FIG. 4 may suffer in a CA 3-8 configuration.

As an additional example, the conventional front end circuitry 50 will also experience problems in carrier-aggregation applications using bands 4 and 17 (CA 4-17), because the third harmonic of a band 17 transmit signal (2112-2148 MHz) falls within a band 4 receive signal (2110-2155 MHz). The problem with the conventional front end circuitry 50 may occur in any carrier aggregation configuration using operating bands in which the harmonic components of the carrier signal fall within the frequency band of the receive signal. The limited combination of operating bands usable in a carrier aggregation configuration by the conventional front end circuitry 50 illustrated in FIG. 4 may impede the performance and versatility of a mobile device.

In addition to the problems encountered by the conventional front end circuitry 50 when one or more harmonics of a transmit signal fall within a receive operating band, the conventional front end circuitry 50 is also limited to inter-band carrier aggregation applications, in which the transmit signal and the receive signal are located in different operating bands that are separated by a certain frequency delta. Because the conventional front end circuitry 50 includes only two antennas, each one of the antennas 56 must be used to simultaneously receive signals within a first carrier aggregation operating band and a second carrier aggregation operating band. Accordingly, the diplexers 54 must separate each incoming RF signal so that they may be routed to the correct receiving circuitry in the conventional front end circuitry 50. In order for the diplexers 54 to properly separate incoming RF signals, the operating bands of the received RF signals must be separated by a certain frequency delta, as determined by the filter response of the diplexers 54. Generally, one of the received RF signals must be a high band signal, while the other received RF signal must be a low band signal. If the signals are not separated by an appropriate frequency delta, the received signals will not be separated by the diplexers 54, and both signals will be passed to the same receive circuitry in the conventional front end circuitry 50. Accordingly, the conventional front end circuitry 50 cannot operate in either contiguous or non-contiguous intra-band carrier aggregation applications.

A further challenge presented by the conventional front end circuitry 50 is the wide band antennas 56 required for proper operation of the circuitry. Due to the fact that the conventional front end circuitry 50 uses a single antenna to simultaneously receive both low band and high band signals, the antennas 56 must be operable over a wide bandwidth. Creating such wide bandwidth antennas generally requires tunable components and high order filters, which generally add to the complexity and cost of a mobile terminal, and may introduce additional insertion loss into the RF signal path.

Figure 5:
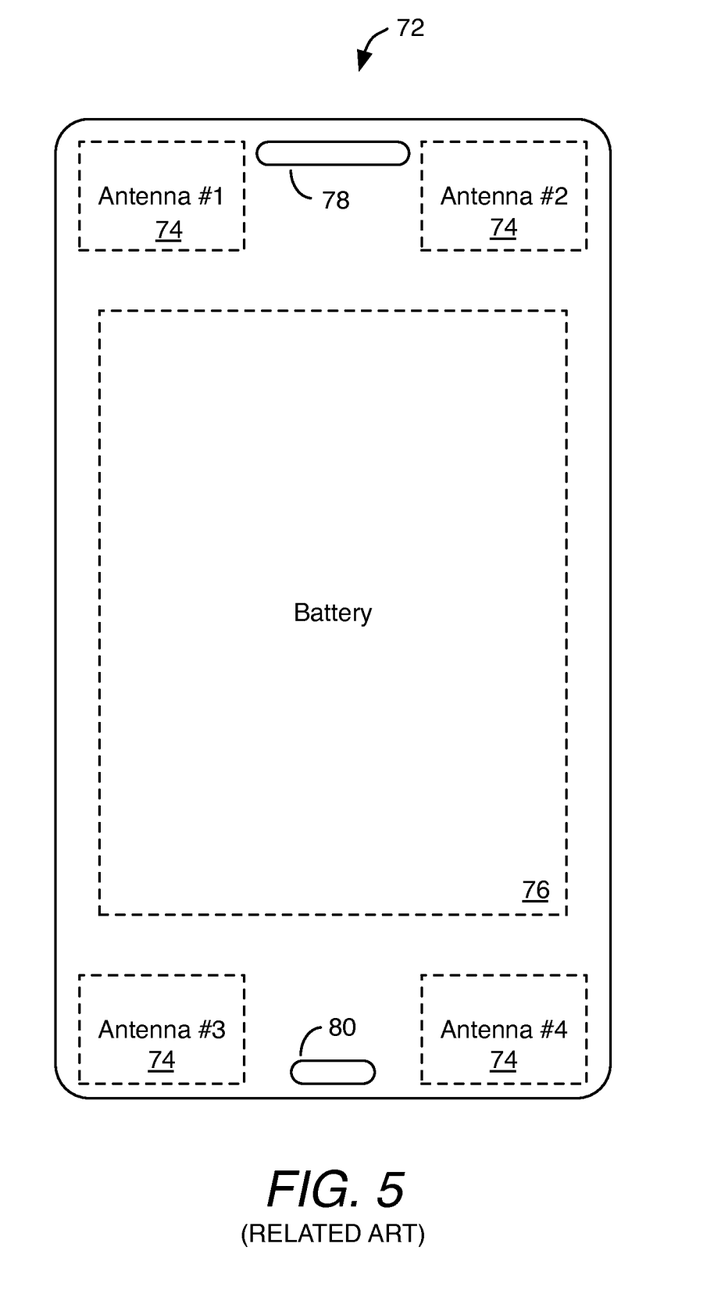
FIG. 5 is a schematic representation of a mobile phone having four antennas.

FIG. 5 shows an exemplary configuration of a mobile device 72 including four antennas 74. For context, a battery 76, a speaker 78, and a charging port 80 are also shown. As shown in FIG. 5, each antenna 74 in the mobile device 72 is placed in a corner of the device. Accordingly, each one of the antennas 74 is separated from the others by some physical distance. Due to the orientation of the mobile device 72, for example, in a user's hand, one of the antennas 74 may experience a higher transmit efficiency and/or higher receive sensitivity than the others. As the orientation of the mobile device 72 changes, the most efficient or sensitive antenna may also change. In order to optimize the performance of the mobile device 72, front end circuitry within the mobile device 72 should be capable of dynamically selecting the most efficient antenna for transmission and reception of wireless signals.

Accordingly, there is a need for front end circuitry that is capable of operating in all carrier aggregation configurations while reducing cross-distortion between signals, and is further capable of antenna swapping to optimize the performance of a mobile device.

SUMMARY

Radio frequency (RF) front end circuitry includes one or more antenna ports, one or more RF switching ports, and an RF switch matrix coupled between the antenna ports and the RF front end ports. The RF switch matrix comprises a dual 4×4 multiplexer, and is adapted to selectively couple any one of the antennas to any one of the plurality of RF switching ports.

According to one embodiment, the RF front end circuitry is adapted to receive a first RF signal about a first carrier frequency at a first one of the antenna ports, and route the first RF signal to a first one of the RF front end ports. The RF switch matrix is further adapted to simultaneously receive a second RF signal about a second carrier frequency at a second one of the antenna ports, and route the second RF signal to a second one of the RF front end ports, such that the first RF signal and the second RF signal are within the same frequency band.

By receiving the first RF signal and the second RF signal at different antennas, each received RF signal is isolated from one another, thereby allowing the RF front end circuitry to operate in carrier aggregation configurations that aggregate bandwidth across the same or similar operating bands.

According to one embodiment, each one of the antennas is coupled to an RF switch matrix such that no diplexer circuitry exists between each antenna and the RF switch matrix.

According to one embodiment, the RF switch matrix is further adapted to simultaneously route a third RF signal from a third one of the RF front end ports to a third antenna port for transmission of the third RF signal.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 6:
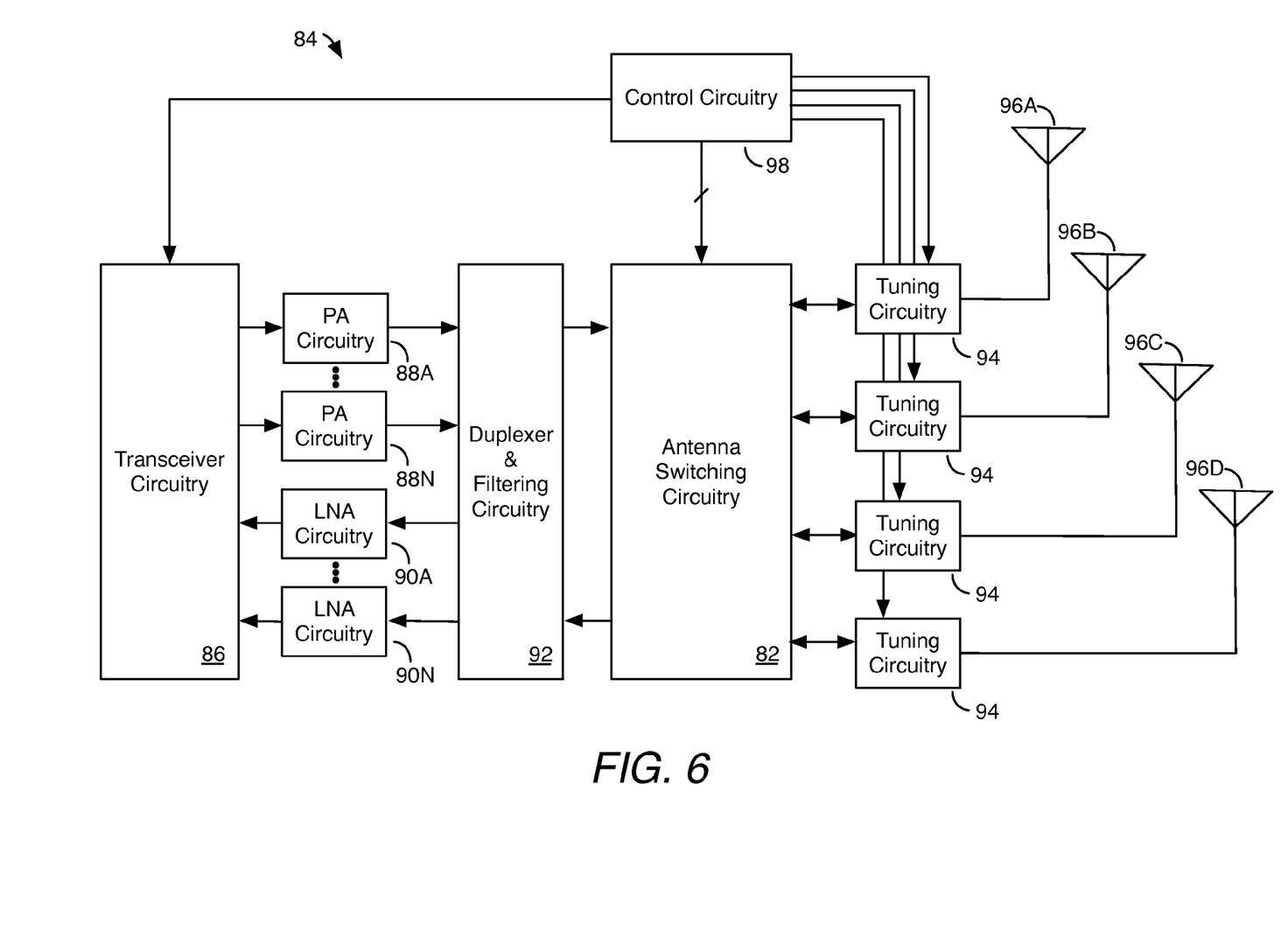
FIG. 6 is a schematic representation of front end circuitry for use in a mobile terminal according to one embodiment of the present disclosure.

Turning now to FIG. 6, a first embodiment of radio frequency (RF) antenna switching circuitry 82 is incorporated into a mobile terminal front end 84. The basic architecture of the mobile terminal front end 84 includes transceiver circuitry 86, a plurality of power amplifiers 88A-88N (referred to collectively as the power amplifiers 88), a plurality of low noise amplifiers 90A-90N (referred to collectively as the low noise amplifiers 90), duplexer and filtering circuitry 92, the antenna switching circuitry 82, antenna tuning circuitry 94, a plurality of antennas 96A-96D (referred to collectively as the antennas 96), and control circuitry 98. When receiving a signal, the mobile terminal front end 84 receives information bearing radio frequency signals at one or more of the antennas 96 from one or more remote transmitters provided by a base station (not shown). The radio frequency signals pass through the antenna tuning circuitry 94 to the antenna switching circuitry 82. The antenna switching circuitry 82 selectively couples each one of the antennas 96 to a single one of the low noise amplifiers 90 through the duplexer and filtering circuitry 92, thereby isolating each received RF signal from one another. One or more of the plurality of low noise amplifiers 90 amplify the received components of the radio frequency signals and deliver them to the transceiver circuitry 86, where they may be subsequently processed and used by the mobile terminal front end 84. Each one of the low noise amplifiers 90 may be associated with and optimized for processing of signals about a given operating band or group of operating bands.

On the transmit side, the transceiver circuitry 86 receives digitized data, which may represent voice, data, or control information. The encoded data is modulated to produce a carrier signal at a desired transmit frequency. The carrier signal is then delivered to one or more of the power amplifiers 88, where it is amplified and delivered to the antenna switching circuitry 82 through the duplexer and filtering circuitry 92. Each one of the power amplifiers 88 may be associated with and optimized for processing of signals about a given operating band or group of operating bands. The antenna switching circuitry 82 selectively couples an output terminal of the duplexer and filtering circuitry 92 to one of the antennas 96 through the antenna tuning circuitry 94, such that the optimal antenna is chosen for transmission of the signal, as will be discussed in further detail below.

The control circuitry 98 may be in communication with the antenna switching circuitry 82, the antenna tuning circuitry 94, and the transceiver circuitry 86 to control one or more operating parameters of the mobile terminal front end 84. For example, the control circuitry 98 may be adapted to place the mobile terminal front end 84 into a diversity mode of operation, in which the first antenna 96A and the second antenna 96B are used to support communications about a first carrier aggregation operating band, while the third antenna 96C and the fourth antenna 96D are used to support communications about a second carrier aggregation operating band. The control circuitry 98 may also be adapted to place the mobile terminal front end 84 into a multiple input multiple output (MIMO) mode of operation, whereby different signals are transmitted and received by at least two of the antennas 96 simultaneously. The control circuitry 98 may control the antenna switching circuitry 82 such that the control circuitry 98 determines the signal path between the antennas 96 and the duplexer and filtering circuitry 92.

In non-carrier aggregation modes, only two of the four antennas 96 are used. The most efficient antenna 96 is generally selected as the main transmit and receive antenna for a first operating band, while the second antenna is used as a diversity antenna for the same first operating band. The antenna tuning circuitry 94 may be used to improve the impedance match between each antenna 96 and the antenna switching circuitry 82. Antenna resonance tuning components may be included in the antenna tuning circuitry 94 in order to improve the efficiency of the antennas 96.

In carrier aggregation modes, all four of the antennas 96 are used. Two of the antennas 96 are used for transmission and reception of RF signals about a first carrier aggregation operating band, while the other two antennas 96 are used to receive RF signals about a second carrier aggregation operating band. Generally, the most efficient antenna will be selected for use as the main transmit and receive antenna for the first carrier aggregation operating band, while the three remaining antennas will be used for the three remaining receive signal paths. Specifically, one of the three remaining antennas 96 will be used as a diversity antenna for the first carrier aggregation operating band, a different one of the three remaining antennas 96 will be used as a main receive antenna for the second carrier aggregation operating band, and the last antenna will be used as a diversity antenna for the second carrier aggregation operating band.

By isolating each one of the carrier aggregation signals from one another across the antennas 96, the mobile terminal front end 84 is able to support all carrier aggregation modes, including contiguous intra-band carrier aggregation and non-contiguous intra-band carrier aggregation, as will be discussed in further detail below. Specifically, the mobile terminal front end 84 is capable of operating in carrier aggregation configurations using two different low band signals (LB-LB), using one low band signal in combination with one mid-band signal (LB-MB), using two different mid-band signals (MB-MB), using one mid-band signal in combination with one high band signal (MB-HB), using one low band signal in combination with one high band signal (LB-HB), or using two different high band signals (HB-HB) without the use of additional diplexers, quadplexers, etc.

Due to environmental factors such as the orientation and physical position of the mobile device in which the antennas 96 are incorporated, one of the antennas 96 may exhibit performance characteristics that are superior to the other antennas 96. For example, one of the antennas 96 may experience a higher efficiency when compared with the other antennas 96. Accordingly, the antenna switching circuitry 82 is adapted to choose the antenna 96 having the optimum performance characteristics for transmission and/or reception of a signal at any given time. Further, the antenna switching circuitry 82 may be adapted to dynamically change the antenna for transmission and/or reception of a signal as the antenna with optimum performance characteristics changes over time.

According to one embodiment, the antenna tuning circuitry 94 may be configured to ensure optimal operation of the antennas 96 by altering the impedance seen by each one of the antennas 96. Antenna resonance tuning components may be included in the antenna tuning circuitry 94 in order to improve the efficiency of the antennas 96. As discussed above, the mobile terminal front end 84 operates each one of the antennas 96 within a single operating band at a time, thereby foregoing the need for extremely wide band antennas. Accordingly, the antenna tuning circuitry 94 may have reduced complexity and linearity requirements when compared with the conventional front end solutions, thereby increasing the efficiency of the mobile terminal front end 84. Because each one of the antennas 96 in the mobile terminal front end 84 is operated within a single operating band at a time, the antenna tuning circuitry 94 may be eliminated according to some embodiments of the present disclosure.

The duplexer and filtering circuitry 92 may be adapted to separate transmit and receive signals such that transmit signals are passed from the power amplifiers 88 to the antenna switching circuitry 82, and receive signals are passed from the antenna switching circuitry 82 to the appropriate low noise amplifier 90. Further, the duplexer and filtering circuitry 92 may be adapted to filter passing signals in order to isolate a desired frequency component thereof. For example, the duplexer and filtering circuitry 92 may comprise one or more high-pass filters, low-pass filters, or band-pass filters in order to isolate signals within a certain carrier frequency operating band before passing the signals to the appropriate low noise amplifier 90. The duplexer and filtering circuitry 92 may comprise a plurality of surface acoustic wave (SAW) duplexers, a plurality of bulk acoustic wave (BAW) duplexers, or the like.

Figure 7:
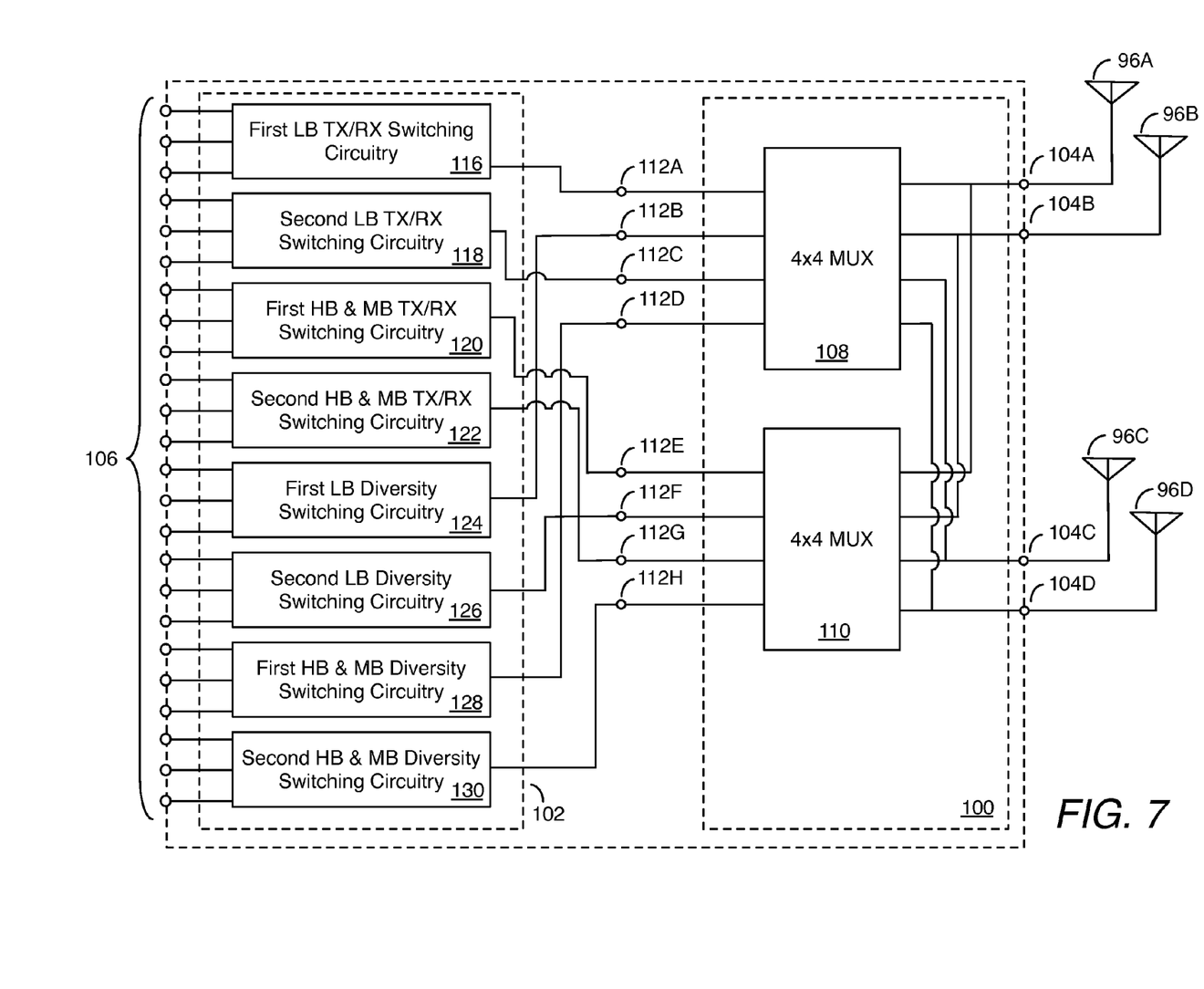
FIG. 7 is a schematic representation of an RF switch matrix located in the RF front end circuitry of FIG. 6.

FIG. 7 shows details of the antenna switching circuitry 82 shown in FIG. 6. The antenna switching circuitry 82 includes an RF switch matrix 100, support switching circuitry 102, one or more antenna ports 104A-104D (referred to collectively as the antenna ports 104), and one or more RF front end ports 106. The RF switch matrix 100 includes a first multiplexer 108, a second multiplexer 110, and a plurality of RF switching ports 112A-112H (referred to collectively as the RF switching ports 112). According to one embodiment, the first multiplexer 108 and the second multiplexer 110 are 4×4 multiplexers. The RF switch matrix 100 is adapted to place one or more of the antenna ports 104 in communication with one of the RF switching ports 112 in order to couple each antenna 96 to the correct power amplifier 88 or the correct low noise amplifier 90 through the support switching circuitry 102 and the duplexer and filtering circuitry 92.

The support switching circuitry 102 includes first low band transmit and receive switching circuitry 116, second low band transmit and receive switching circuitry 118, first high band transmit and receive switching circuitry 120, second high band transmit and receive switching circuitry 122, first low band diversity switching circuitry 124, second low band diversity switching circuitry 126, first high band diversity switching circuitry 128, and second high band diversity switching circuitry 130. The support switching circuitry 102 is adapted to place one or more of the RF switching ports 112 in communication with the appropriate one of the RF front end ports 106 so that the signal can be routed through the duplexer and filtering circuitry 92 to the correct power amplifier 88 or the correct low noise amplifier 90.

Each one of the first low band transmit and receive switching circuitry 116, the second low band transmit and receive switching circuitry 118, the first high band transmit and receive switching circuitry 120, the second high band transmit and receive switching circuitry 122, the first low band diversity switching circuitry 124, the second low band diversity switching circuitry 126, the first high band diversity switching circuitry 128, and the second high band diversity switching circuitry 130 may be associated with a group of the power amplifiers 88 or the low noise amplifiers 90 adapted to process signals about a given operating band or group of operating bands. For example, the first low band transmit and receive switching circuitry 116 may be associated with a group of the power amplifiers 88 and the low noise amplifiers 90 adapted to process low band signals.

The control circuitry 98 may be adapted to control the antenna switching circuitry 82 such that each one of the antennas 96 is used to support the transmission and reception of signals about a single operating band at a time. For instance, the first antenna 96A and the second antenna 96B may be used to support communications over a first carrier aggregation operating band, while the third antenna 96C and the fourth antenna 96D may be used to support communications over a second carrier aggregation operating band. By limiting the use of each antenna to a single operating band, cross-distortion between signals is eliminated by antenna-to-antenna isolation. Accordingly, the antenna switching circuitry 82 enables the mobile terminal front end 84 to operate in any of the carrier aggregation configurations, including contiguous intra-band carrier aggregation configurations and non-contiguous intra-band carrier aggregation configurations.

For example, in a carrier aggregation configuration simultaneously using band 5 and band 12 (CA 5-12), the first antenna 96A may be used as the main transmit and receive antenna for band 5 signals, the second antenna 96B may be used as the diversity antenna for band 5 signals, the third antenna 96C may be used as the main receive antenna for band 12 signals, and the fourth antenna 96D may be used as the diversity antenna for band 12 signals. The antenna switching circuitry 82 may be adapted to place each one of the antennas 96 in communication with the proper switching circuitry within the support switching circuitry 102 such that each antenna 96 is coupled to the appropriate power amplifier 88 or low noise amplifier 90 for the operating band through the duplexer and filtering circuitry 92. The mobile terminal front end 84 may operate in a similar way in carrier aggregation configurations simultaneously using bands 5 and 17 (CA 5-17) and bands 20 and 8 (CA 20-8).

As an additional example, in a carrier aggregation configuration simultaneously using band 1 and band 7 (CA 1-7), the first antenna 96A may be used as the main transmit and receive antenna for band 1 signals, the second antenna 96B may be used as the diversity antenna for band 1 signals, the third antenna 96C may be used as the main receive antenna for band 7 signals, and the fourth antenna 96D may be used as the diversity antenna for band 7 signals. The antenna switching circuitry 82 may be adapted to place each one of the antennas 96 in communication with the proper switching circuitry within the support switching circuitry 102 such that each antenna 96 is coupled to the appropriate power amplifier 88 or low noise amplifier 90 for the operating band through the duplexer and filtering circuitry 92. The mobile terminal front end 84 may operate in a similar way in carrier aggregation configurations simultaneously using bands 3 and 7 (CA 3-7) and bands 4 and 7 (CA 4-7).

Figure 8:
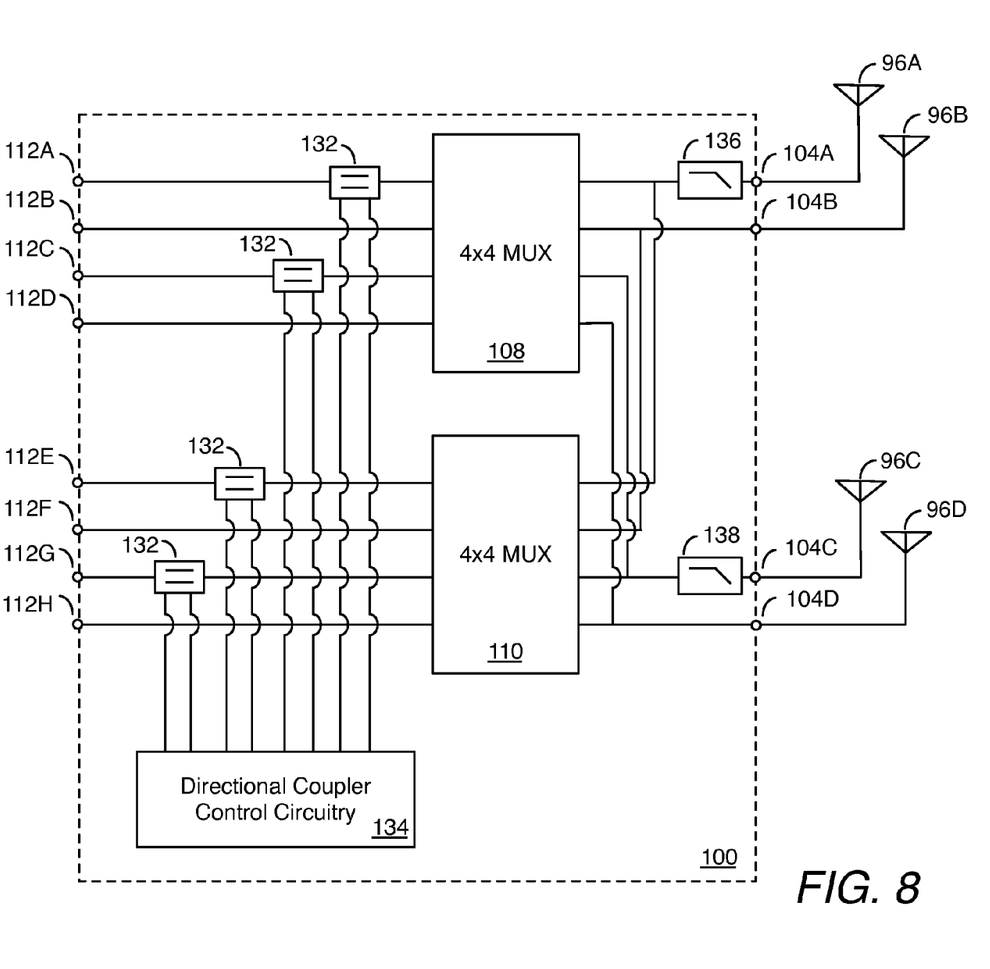
FIG. 8 is a schematic representation of an additional embodiment of an RF switch matrix located in the RF front end circuitry of FIG. 6.

FIG. 8 shows details of the RF switch matrix 100 according to one embodiment of the present disclosure. The RF switch matrix 100 shown in FIG. 8 is substantially similar to that shown in FIG. 7, but further includes one or more directional couplers 132 and directional coupler control circuitry 134 in order to direct the flow of signals to and from the RF switching ports 112. Each one of the directional couplers 132 may be adapted to switch the coupled RF switching port 112 into either a receive mode of operation, in which signals received from either the first multiplexer 108 or the second multiplexer 110 are routed to the RF switching port 112, or a transmit mode of operation, in which signals received at the RF switching port 112 are routed to either the first multiplexer 108 or the second multiplexer 110. The directional coupler control circuitry 134 may be adapted to switch each one of the directional couplers 132 between the transmit mode of operation and the receive mode of operation.

FIG. 8 also shows a first low pass filter 136 coupled between the first antenna port 104A and the first multiplexer 108 and a second low pass filter 138 coupled between the third antenna port 104C and the second multiplexer 110. Each one of the first low pass filter 136 and the second low pass filter 138 may be adapted to filter signals passed to and from the first antenna 96A and the third antenna 96C, respectively, in order to minimize distortion in the signal path of the antennas.

Figure 9:
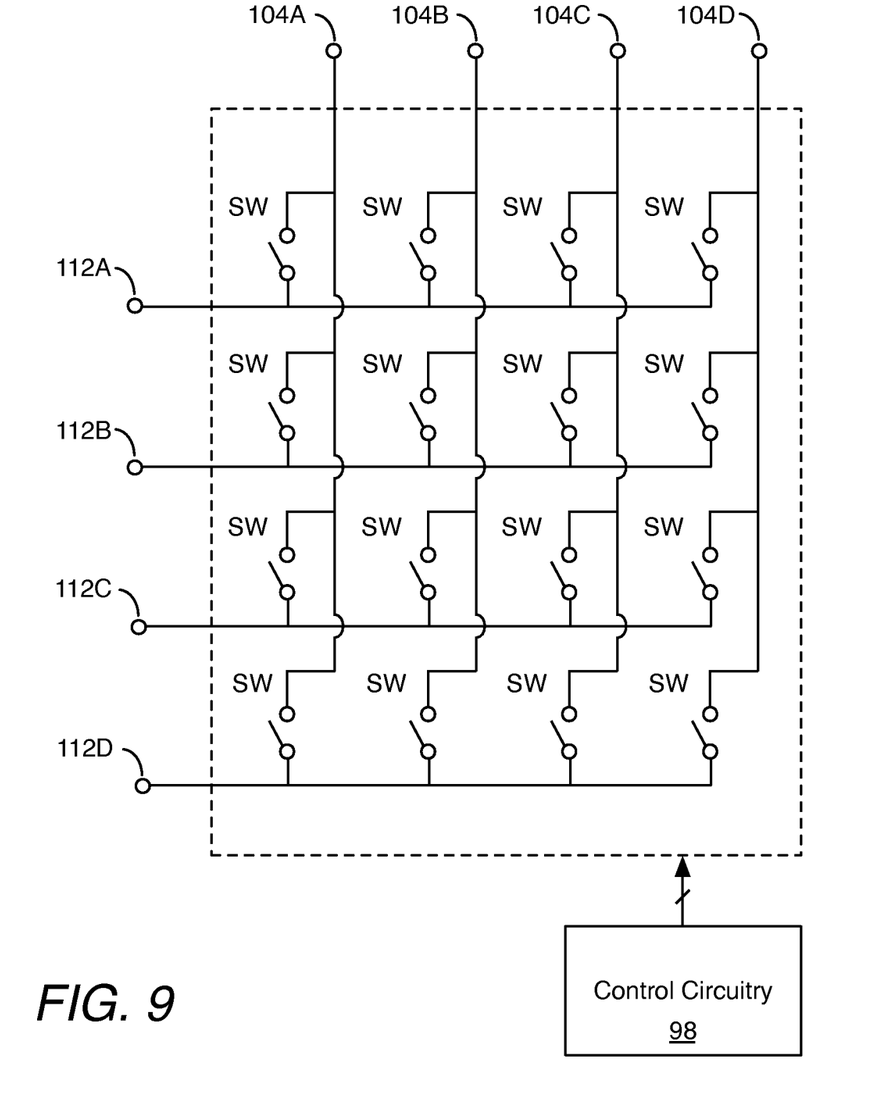
FIG. 9 is a schematic representation of a MUX located in the RF switch matrix of FIGS. 7-9 according to one embodiment of the present disclosure.

FIG. 9 shows details of each one of the first multiplexer 108 and the second multiplexer 110 according to one embodiment of the present disclosure. For context, the control circuitry 98, the antenna ports 104, and the RF switching ports 112 are also shown. According to this embodiment, each one of the first multiplexer 108 and the second multiplexer 110 is a 4×4 multiplexer including sixteen switches SW arranged in a grid pattern such that any one of the RF switching ports 112 can be coupled to any one of the antenna ports 104. The control circuitry 98 may be coupled to each one of the switches SW in order to control the signal path from each one of the RF switching ports 112 to the appropriate antenna port 104.

Due to the flexibility of the first multiplexer 108 and the second multiplexer 110, the mobile terminal front end 84 (FIG. 6) is capable of coupling any one of the antennas 96 to any one of the power amplifiers 88 or low noise amplifiers 90. The control circuitry 98 may be adapted to select the antenna with the most desirable performance characteristics at a given time in order to couple with a given power amplifier 88 or low noise amplifier 90. Further, the control circuitry 98 may be adapted to dynamically switch the antenna coupled to a given power amplifier 88 or low noise amplifier 90 in order to optimize the transmission and/or reception of signals in the mobile terminal front end 84 as the optimal antenna changes over time.

As will be appreciated by one of ordinary skill in the art, at certain times a single antenna 96 may be the optimal antenna for the transmission and/or reception of signals about multiple operating bands. In this case, the control circuitry 98 may prioritize the transmission and/or reception of signals about one of the operating bands, and couple the appropriate power amplifier 88 or low noise amplifier 90 associated with the first operating band to the antenna with the most desirable performance characteristics.

Figure 10:
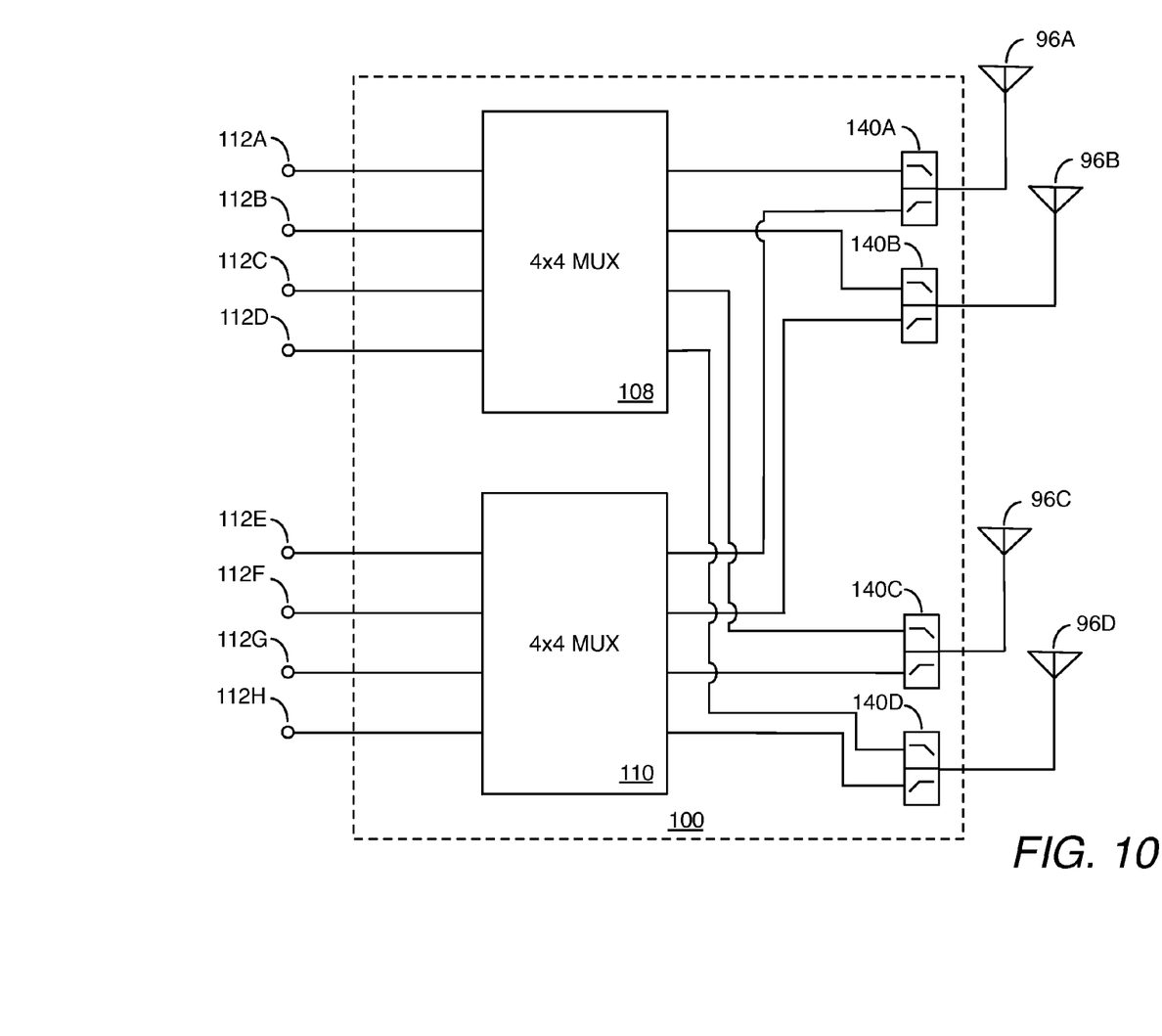
FIG. 10 is a schematic representation of an additional embodiment of the RF switch matrix located in the RF front end circuitry of FIG. 6.

FIG. 10 shows an alternative architecture for the RF switch matrix 100 that allows for the simultaneous transmission and/or reception of signals about two operating bands on a single antenna 96. The RF switch matrix 100 shown in FIG.

10 is substantially similar to the RF switch matrix shown in FIGS. 7 and 8, but further includes a plurality of diplexers 140A-140D (referred to collectively as the diplexers 140). Each one of the diplexers 140 is coupled between one of the antenna ports 104, the first multiplexer 108, and the second multiplexer 110. Each one of the diplexers 140 is adapted to separate incoming RF signals from the antennas 96 into a high band component and a low band component so that they may be routed to the appropriate low noise amplifier 90. Further, each one of the diplexers 140 is adapted to combine separate outgoing RF signals from one or more power amplifiers 88 into a single signal for transmission.

By placing a diplexer 140 in the signal path of each antenna 96, each antenna can be simultaneously used by two operating bands. Accordingly, when one of the antennas 96 has performance characteristics that are superior to the other antennas 96, for instance, due to the orientation of the mobile device in which it is incorporated, the optimal antenna may be placed in communication with the appropriate power amplifier 88 or low noise amplifier 90 for transmission and/or reception of an RF signal. Those skilled in the art will appreciate that a diplexer may be used in the signal path of any subset of the antennas 96 without departing from the principles of the present disclosure.

The diplexers 140 may allow the RF switch matrix 100 to support carrier aggregation configurations that simultaneously aggregate bandwidth across three or four operating bands. For example, the RF switch matrix 100 may be adapted to use the first antenna 96A as a first transmit and receive antenna for a first operating band, use the second antenna 96B as a MIMO receive antenna for the first operating band, use the third antenna 96C as a MIMO receive antenna for a second operating band, and use the fourth antenna 96D as a MIMO receive antenna for a third operating band.

As a further example, the RF switch matrix 100 may be adapted to use the first antenna 96A as a transmit and MIMO receive antenna for a first operating band, use the second antenna 96B as a MIMO receive antenna for a second operating band, use the third antenna 96C as a MIMO receive antenna for a third operating band, and use the fourth antenna 96D as a MIMO receive antenna for a fourth operating band.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) front end circuitry comprising:
   at least four antenna ports;
   a plurality of RF front end ports;
   antenna switching circuitry coupled between the at least four antenna ports and the plurality of RF front end ports;
   duplexer and filtering circuitry comprising a plurality of filters each coupled to a different one of the plurality of RF front end ports and configured to selectively pass RF signals falling within at least one operating band between the antenna switching circuitry and transceiver circuitry while attenuating other signals;
   control circuitry coupled to the antenna switching circuitry and configured to place the RF front end circuitry into a carrier aggregation mode of operation by causing the antenna switching circuitry to simultaneously:
      couple a first one of the at least four antenna ports to a first one of the plurality of RF front end ports associated with a first filter in the duplexer and filtering circuitry configured to selectively pass RF transmit and receive signals about a first operating band while attenuating other signals;
      couple a second one of the at least four antenna ports to a second one of the plurality of RF front end ports associated with a second filter in the duplexer and filtering circuitry configured to selectively pass RF receive signals about the first operating band while attenuating other signals;
      couple a third one of the at least four antenna ports to a third one of the plurality of RF front end ports associated with a third filter in the duplexer and filtering circuitry configured to selectively pass RF receive signals about a second operating band while attenuating other signals; and
      couple a fourth one of the at least four antenna ports to a fourth one of the plurality of RF front end ports associated with a fourth filter in the duplexer and filtering circuitry configured to selectively pass RF receive signals about the second operating band while attenuating other signals.

2. The RF front end circuitry of claim 1 wherein the antenna switching circuitry comprises:
   an RF switch matrix comprising a dual 4×4 multiplexer coupled between the at least four antenna ports and a plurality of RF switching ports and configured to selectively couple any one of the at least four antenna ports to any of the plurality of RF switching ports; and
   support switching circuitry coupled between the RF switching ports and the plurality of RF front end ports and configured to selectively couple any of the RF switching ports to one or more of the RF front end ports.

3. The RF front end circuitry of claim 2 further comprising a plurality of directional couplers, wherein each one of the plurality of directional couplers is coupled between one of the plurality of RF switching ports and the RF switch matrix.

4. The RF front end circuitry of claim 3 further comprising directional coupler control circuitry configured to switch each one of the plurality of directional couplers between a transmit mode of operation, in which signals received at the plurality of RF switching ports are routed in a single direction to the RF switch matrix, and a receive mode of operation, in which signals received at the RF switch matrix are routed in a single direction to the plurality of RF switching ports.

5. The RF front end circuitry of claim 1 further comprising antenna tuning circuitry coupled between each one of the at least four antenna ports and the antenna switching circuitry and configured to match an impedance between the antenna switching circuitry and a load presented at the at least four antenna ports.

6. The RF front end circuitry of claim 5 wherein the antenna tuning circuitry includes resonance tuning circuitry.

7. The RF front end circuitry of claim 1 wherein no diplexer circuitry exists between each one of the at least four antenna ports and the antenna switching circuitry.

8. The RF front end circuitry of claim 1 wherein the first operating band and the second operating band are different low band operating bands.

9. The RF front end circuitry of claim 1 wherein the first operating band is a mid band operating band and the second operating band is a high band operating band.

10. The RF front end circuitry of claim 1 wherein the first operating band and the second operating band are different high band operating bands.

11. Mobile terminal front end circuitry comprising:
    transceiver circuitry;
    at least four antennas;

a plurality of radio frequency (RF) front end ports;
antenna switching circuitry coupled between the at least four antennas and the plurality of RF front end ports;
duplexer and filtering circuitry comprising a plurality of filters each coupled to a different one of the plurality of RF front end ports and configured to selectively pass RF signals falling within at least one operating band between the antenna switching circuitry and the transceiver circuitry; and
control circuitry coupled to the antenna switching circuitry and configured to place the RF front end circuitry into a carrier aggregation mode of operation by causing the antenna switching circuitry to simultaneously:
- couple a first one of the at least four antennas to a first one of the plurality of RF front end ports associated with a first filter in the duplexer and filtering circuitry configured to selectively pass RF transmit and receive signals about a first operating band while attenuating other signals;
- couple a second one of the at least four antennas to a second one of the plurality of RF front end ports associated with a second filter in the duplexer and filtering circuitry configured to selectively pass RF receive signals about the first operating band while attenuating other signals;
- couple a third one of the at least four antennas to a third one of the plurality of RF front end ports associated with a third filter in the duplexer and filtering circuitry configured to selectively pass RF receive signals about a second operating band while attenuating other signals; and
- couple a fourth one of the at least four antennas to a fourth one of the plurality of RF front end ports associated with a fourth filter in the duplexer and filtering circuitry configured to selectively pass RF receive signals about the second operating band while attenuating other signals.

12. The RF front end circuitry of claim 11 further comprising a plurality of directional couplers, wherein each one of the plurality of directional couplers is coupled between one or more switching elements in the antenna switching circuitry.

13. The RF front end circuitry of claim 12 further comprising directional coupler control circuitry configured to switch each one of the plurality of directional couplers between a transmit mode of operation, in which signals from the duplexer and filtering circuitry are routed in a single direction towards the at least four antennas, and a receive mode of operation, in which signals received at the RF switch matrix are routed in a single direction towards the transceiver circuitry.

14. The RF front end circuitry of claim 11 further comprising antenna tuning circuitry coupled between each one of the at least four antennas and the antenna switching circuitry and configured to match an impedance between the antenna switching circuitry and the at least four antennas.

15. The RF front end circuitry of claim 14 wherein the antenna tuning circuitry includes resonance tuning circuitry.

16. The RF front end circuitry of claim 11 wherein no diplexer circuitry exists between each one of the at least four antennas and the antenna switching circuitry.

17. The RF front end circuitry of claim 11 wherein the first operating band and the second operating band are different low band operating bands.

18. The RF front end circuitry of claim 11 wherein the first operating band is a mid band operating band and the second operating band is a high band operating band.

19. The RF front end circuitry of claim 11 wherein the first operating band and the second operating band are different high band operating bands.

20. Radio frequency (RF) front end circuitry comprising:
at least four antennas;
a plurality of RF front end ports;
antenna switching circuitry coupled between the at least four antennas and the plurality of RF front end ports;
duplexer and filtering circuitry comprising a plurality of filters each coupled to a different one of the plurality of RF front end ports and configured to selectively pass RF signals falling within at least one operating band between the antenna switching circuitry and transceiver circuitry while attenuating other signals;
a plurality of diplexers, each coupled between a different one of the at least four antennas and the antenna switching circuitry and comprising at least an antenna port coupled to a respective one of the at least four antennas, a mid/high-band port coupled to the antenna switching circuitry, and a low-band port separately coupled to the antenna switching circuitry;
control circuitry coupled to the antenna switching circuitry and configured to place the RF front end circuitry into a carrier aggregation mode of operation by causing the antenna switching circuitry to simultaneously:
- couple a first one of the plurality of diplexers to a first one of the plurality of RF front end ports associated with a first filter in the duplexer and filtering circuitry configured to selectively pass RF transmit and receive signals about a first operating band while attenuating other signals;
- couple a second one of the plurality of diplexers to a second one of the plurality of RF front end ports associated with a second filter in the duplexer and filtering circuitry configured to selectively pass RF receive signals about a second operating band while attenuating other signals;
- couple a third one of the plurality of diplexers to a third one of the plurality of RF front end ports associated with a third filter in the duplexer and filtering circuitry configured to selectively pass RF receive signals about a third operating band while attenuating other signals; and
- couple a fourth one of the plurality of diplexers to a fourth one of the plurality of RF front end ports associated with a fourth filter in the duplexer and filtering circuitry configured to selectively pass RF receive signals about a fourth operating band while attenuating other signals.

21. The RF front end circuitry of claim 20 wherein the antenna switching circuitry comprises:
an RF switch matrix comprising a dual 4×4 multiplexer coupled between the plurality of diplexers and a plurality of RF switching ports and configured to selectively couple any one of the at least four antenna ports to any of the plurality of RF switching ports; and
support switching circuitry coupled between the RF switching ports and the plurality of RF front end ports and configured to selectively couple any of the RF switching ports to one or more of the RF front end ports.

* * * * *